United States Patent

Goshima et al.

[15] 3,704,349

[45] Nov. 28, 1972

[54] MAGNETIC RECORDING SYSTEM

[72] Inventors: Takeshi Goshima; Yutaka Kohtani, both of Tokyo, Japan

[73] Assignee: Canon Kabushiki Kaisha, Tokyo, Japan

[22] Filed: Jan. 18, 1971

[21] Appl. No.: 106,979

[30] Foreign Application Priority Data

Jan. 21, 1970 Japan ........................45/5891

[52] U.S. Cl. .....................179/100.2 R, 179/100.2 K
[51] Int. Cl. ...............................................G11b 5/02
[58] Field of Search .................179/100.2 R, 100.2 K

[56] References Cited

UNITED STATES PATENTS 3,262,124 7/1966 Johnson et al. ......179/100.2 K
2,876,294 3/1959 Wissmann...........179/100.2 R

*Primary Examiner*—J. Russell Goudeau
*Attorney*—Ward, McElhannon, Brooks & Fitzpatrick

[57] ABSTRACT

An improved magnetic recording system is provided which uses an amplitude-modulated high frequency bias. A first high frequency bias or carrier is amplitude-modulated by a second bias component or modulating wave having a frequency higher than the highest frequency of the input signal but lower than that of the first bias component, and the amplitude-modulated high frequency bias is superposed upon the input signal. The deterioration of the input signal, especially its high frequency component by the prior art unmodulated high frequency bias may be eliminated so that the flat reproduction characteristic may be obtained over the wide range of the input signal. In addition, the improved system requires only the minimum number of component parts.

6 Claims, 5 Drawing Figures

MAGNETIC RECORDING SYSTEM

BACKGROUND OF THE INVENTION

The present invention relates to a magnetic recording system and more particularly an improved magnetic recording system in which the high frequency component of an input signal may be recorded upon a magnetic recording medium without any deterioration or attenuation. residual The so-called DC and AC bias magnetic recording systems have been widely used in the recording of information upon a magnetic tape, magnetic sheet, magnetic drum or the like. Since the B-H curve or the normal magnetization curve of the magnetic recording medium is essentially nonlinear, the operating point in the DC bias system is selected from a limited linear portion of the magnetization curve so that the DC bias with a predetermined level together with the input signal may be applied to a magnetic recording head. In the AC bias system, a bias system having an alternating frequency higher than that of an input signal to be recorded is superposed upon the input signal at the magnetic recording head so that the input signal may be recorded as the vibration in remanent magnetism or residual induction upon the magnetic recording medium which is transported closely apart from the magnetic head.

Since the magnetization curve is essentially nonlinear as described above, the recording will be made along the nonlinear portion of the magnetization curve when the level of the input signal is increased in the DC bias system so that the recorded signal is inevitably distorted. In the AC bias system, the nonlinear portion of the normal magnetization curve may be corrected so that the recording with a higher degree of fidelity may become possible. Therefore, the AC bias system is universally used in high fidelity audio and video magnetic recording and reproduction. However, the AC bias system has a defect that the response at a higher frequency range in reproduction is inferior to that in a lower frequency range. That is, the high frequency characteristic is deteriorated so that the reproduction with a higher degree of fidelity becomes impossible. The reason is considered that the high frequency component or the shorter wavelength of the input signal cannot cause the sufficient magnetic variation or variation in residual induction in the direction of the thickness of the magnetic recording medium. In other words the high frequency component is recorded as the magnetic variation only in the surface layer of the magnetic recording medium so that in reproduction the high frequency component is reduced as compared with the low frequency component. In consequence, the response in the high frequency range is reduced.

In addition, since the high frequency component is recorded only in the surface layer of the magnetic recording medium, it is erased by the high frequency bias superposed upon the input signal to be recorded so that the high frequency component is further attenuated or deteriorated.

Therefore it has been proposed to decrease the high frequency bias current, which causes the deterioration of the high frequency component, so as to minimize the erasing action of the bias current, thereby increasing the residual induction for the high frequency component. However, when the high frequency bias current is decreased, the low frequency component is distorted accordingly, so that this method will not produce a desirable result.

In order to overcome the defect of the AC bias system, there has been proposed another method in which the signal current for the high frequency component is increased so as to compensate for the high frequency response. This method is effective when the input signal current level is low, but when the signal level is high and when the input signal current is increased for the high frequency component, the residual induction is reduced. In consequence, in reproduction the high frequency component is reduced or attenuated. The theoretical analysis of this phenomenon has not been made yet, but the experience shows that when the signal current for high frequency component is increased in order to obtain a flat reproduction characteristic, the high frequency component is reduced in reproduction and the higher the level of the input signal in recording, the lower the level of the reproduced signal in the higher frequency range becomes. Furthermore, this method of increasing the signal current for high frequency component requires additional filters, amplifiers and magnetic heads for multi-channel magnetic recording medium so that a magnetic recording and reproducing system becomes complex in structure.

SUMMARY OF THE INVENTION

It is therefore one of the objects of the present invention to eliminate the effect of the prior art high frequency bias system.

Another object of the present invention is to provide an improved magnetic recording system capable of recording the high frequency component of information or signal to be recorded upon a recording medium without any deterioration or attenuation.

Another object of the present invention is to provide an improved magnetic recording system in which upon information or signal to be recorded is superposed an amplitude-modulated high frequency bias signal which has a frequency higher than that of information or input signal to be recorded and which has been modulated by a modulating wave having a frequency higher than that of information or input signal to be recorded.

In brief, in a magnetic recording system in accordance with the present invention upon the input signal to be recorded is superposed an amplitude-modulated high frequency bias signal which has a frequency higher than that of the signal to be recorded and which has been amplitude modulated by a modulating wave having a frequency higher than that of the signal to be recorded but lower than that of the high frequency bias signal.

In the high frequency bias system in which a high frequency bias is superposed upon an input signal current at a magnetic recording head, the bias magnetic field Hf and the magnetic field Hs due to the input signal to be recorded are produced in the air gap of the magnetic head. When the magnetic recording medium passes near the head gap, it also passes through the fields Hs and Hf so that the residual induction due to Hs is left upon the magnetic recording medium. Since both of the fields Hf and Hs decrease at a same ratio as the magnetic recording medium moves away from the center of the head gap, the magnetic signal or residual induction upon the recording medium is erased or reduced by the field Hs due to the high frequency bias as the magnetic recording medium moves away from the air gap. Especially the high frequency component is reduced to a greater extent as described above.

The present invention is based upon this observed fact that the high frequency component of signal current is reduced by the field Hf produced by the bias current. The Hf component is reduced or attenuated rapidly than the Hs component so that the residual induction due to the field Hs upon the magnetic recording medium may not be influenced by the Hf component. The system of the present invention is simple in structure and the flat reproduction characteristic may be attained over the whole range.

The above and other objects of the present invention will become more apparent from the description of the preferred embodiment thereof taken in conjunction with the accompanying drawing.

DESCRIPTION OF THE PREFERRED EMBODIMENT

Figure 1:
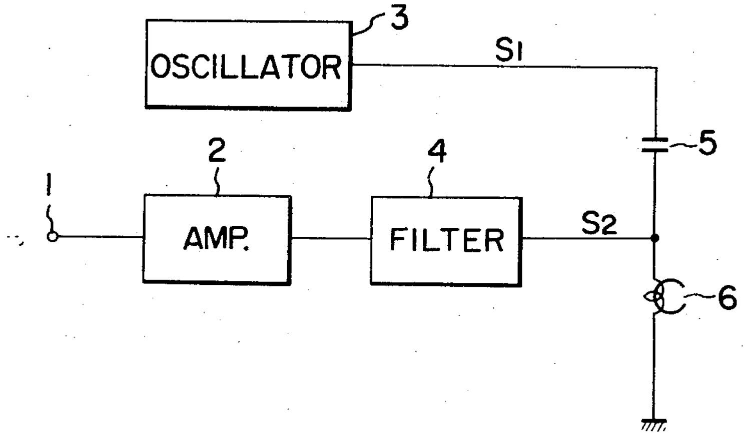
FIG. 1 is a block diagram of the prior art high frequency bias magnetic recording system.
Figures 2, 5:
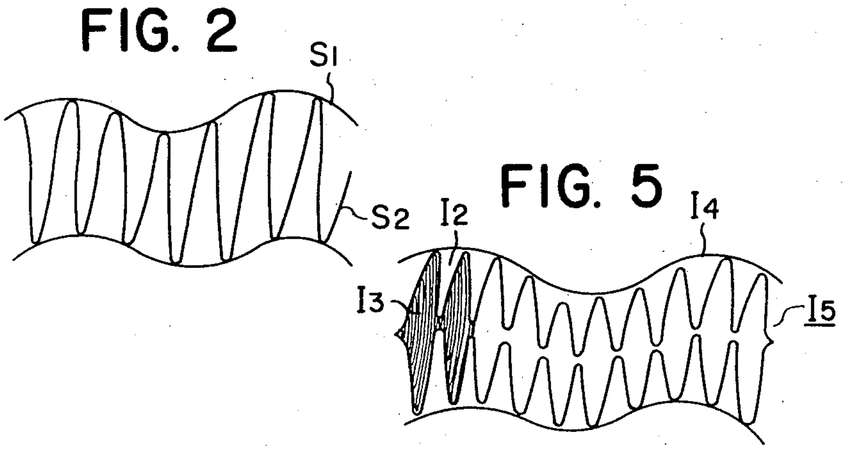
FIG. 2 illustrate the waveform of superposed input and bias signals thereof.
FIG. 5 illustrate the waveform of superposed input and amplitude-modulated high frequency bias signals applied to a magnetic recording head.

Prior Art, FIGS. 1 and 2

Referring to FIG. 1 illustrating in block diagram the prior art high frequency bias recording system, the audio or video signals to be recorded upon a magnetic recording medium are applied to an input terminal 1 of an amplifier 2. The high frequency bias signals generated by a high frequency bias oscillator 3 are cut off from the amplifier 2 by a bias signal cut-off filter 4 and the input signals are cut off from the oscillator 3 by a recording signal cut-off capacitor 5. A magnetic head 6 is in contact with the magnetic recording medium (not shown).

The frequency of the bias signals generated by the oscillator 3 is a few times that of the input signals applied at the input terminal 1, amplified by the amplifier 2, superposed upon the bias signals and applied to the magnetic record head 6 so as to record them upon the magnetic recording medium. The waveform of the signal applied to the magnetic head 6 is shown in FIG. 2, the signal $S_1$ to be recorded being superposed as an envelop upon the high frequency bias signal $S_1$. The pattern of the remanent magnetism or residual induction directly proportional to the signal to be recorded is impressed upon the magnetic recording medium.

The level of the high frequency bias signal $S_2$ applied by this system is so high that the leakage flux due to the high frequency bias signal which is attenuated symmetrically about the air gap of the magnetic head occurs. As a consequence, the remanent magnetism impressed upon the magnetic recording medium directly proportional to the signal to be recorded $S_1$ is erased by the damping produced by the high frequency bias signal outside of the air gap of the magnetic recording head 6. Especially this erasing action is remarkably noted in the high frequency range of the signal to be recorded. So far there has not proposed yet a magnetic recording system in which the magnetic recording characteristic is flat over a wide range of frequency.

Figure 3:
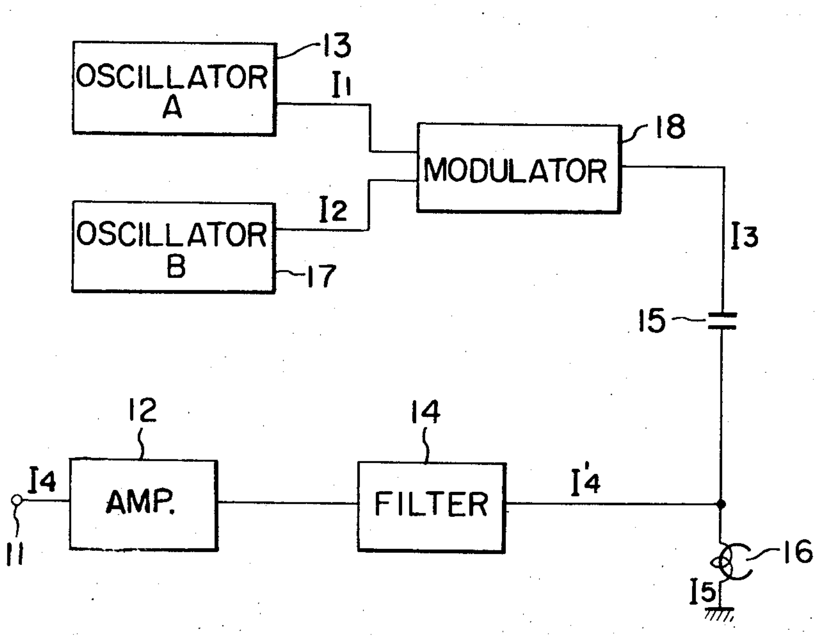
FIG. 3 is a block diagram of a magnetic recording system in accordance with the present invention.
Figure 4:
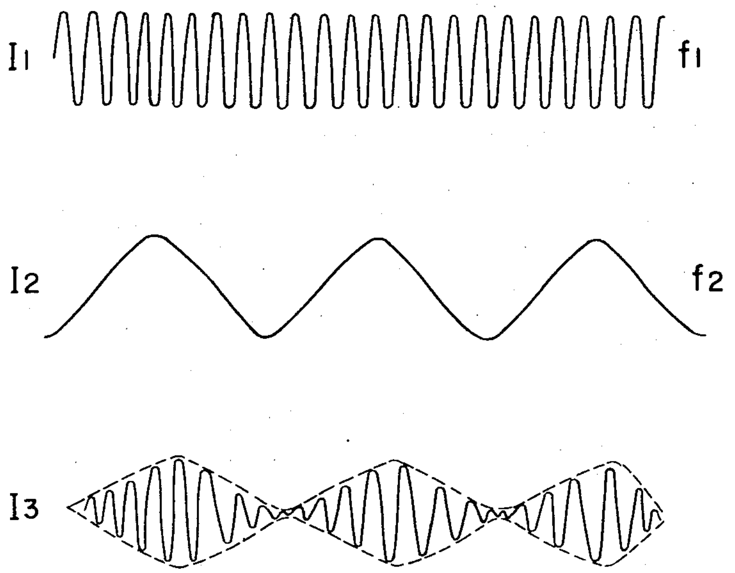
FIG. 4 illustrates the waveforms of bias signal components $I_1$ and $I_2$ and an amplitude-modulated high frequency bias signal $I_3$ used in the present invention.

The Present Invention, FIGS. 3, 4 and 5

Next the present invention will be described in detail with reference to FIGS. 3-5. First referring to FIG. 3, 11 designates an input terminal to which is applied a signal to be recorded; 12, an amplifier for amplifying the signal to be recorded; 13, a high frequency bias signal oscillator; 14, a bias signal cut-off filter; 15, a capacitor for cutting off the signal to be recorded; 16, a magnetic recording head; 17, a modulating wave generating oscillator; and 18, an amplitude modulator.

The amplitude modulator 18 has a function of amplitude-modulating the bias signal current $I_1$ from the high frequency bias generator 13 by the output current $I_2$ from the modulating wave generating oscillator 17. The frequency $f_1$ of the bias signal current $I_1$ is selected sufficiently higher than the frequency $f_2$ of the modulating wave $I_2$, that is $f_1 >> f_2$. The percentage modulation of the modulator 18 is preferably 100 percent (modulation degree = 1), which is not necessary as far as the percentage modulation is close to 100 percent.

As to the frequencies $f_1$ and $f_2$ of the outputs from the high frequency bias generating oscillator 13 and the modulating wave generating oscillator 17 are for example 300 KHz and 60 KHz respectively when the audio signal with the highest frequency of 20 KHz is applied to the input terminal 11. Both of the high frequency bias generating oscillator 13 and the modulating wave generating oscillator 17 may be of the conventional type oscillator.

As shown in FIG. 4, the output current $I_1$ from the oscillator 13 is amplitude-modulated with the modulating wave $I_2$ from the oscillator 17 by the modulator 18 to produce output wave $I_3$. The input current $I_4$ is amplified by the amplifier 12 and the amplified current $I_4'$ is superposed upon the amplitude-modulated current $I_3$, which is applied through the capacitor 15, so that the current $I_5$ having the waveform as shown in FIG. 5 is applied to the magnetic recording head 16 whose air-gap is made in contact with the magnetic recording medium as with the case of the magnetic head 6 in FIG. 1.

When the signal current $I_5$ is applied to the magnetic recording head 16, the remanent magnetism is impressed upon the magnetic recording medium by the magnetic field Hs generated by the electrical signal $I_4$ in the air gap of the magnetic recording head 16, thus leaving upon the magnetic recording medium a series of magnetized sections which correspond to the electrical signal $I_4$ applied to the head 16 when the head gap was in contact with the recording medium at each of the sections. In this case, the bias magnetic field Hf produced by the bias current $I_3$ is immediately decreased, only leaving the field Hs. As a consequence, the magnetic field Hf, which is gradually decreased, does not exist in the proximity of the air gap of the magnetic head so that the remanent magnetism left upon the magnetic recording medium by Hs will not be erased by Hf. Thus only the remanent magnetism corresponding to the electrical signal $I_4$ is left upon the magnetic recording medium. There is no defect that the signal to be recorded $I_4$, especially its high frequency component is deteriorated. In other words, the defect of the prior art that the signal to be recorded is erased may be eliminated so that the high frequency component of the signal to be recorded $I_4$ is not attenuated at all when recorded upon the magnetic recording medium. As a consequence, the magnetic recording characteristic which is flat over the wide range of the frequency of the signal to be recorded may be obtained.

The best result will be attained when the percentage modulation of the amplitude modulator 18 is 100percent, but the better result may be also obtained by a percentage modulation less than 100 percent.

In summary, the present invention utilizes the modified bias signal which is obtained by amplitude modulating the high frequency bias signal by a signal having a frequency higher than that of the information signal to be recorded and superposes this modified bias upon the signal to be recorded at the magnetic recording head so as to magnetically record the signal to be recorded upon the magnetic recording medium. Therefore, the signal recorded upon the magnetic recording medium as the remanent magnetism corresponding to the input signal will not be erased at all by the high frequency bias signal so that the input signal may be recorded upon the magnetic recording medium with a higher degree of fidelity.

As described above, the present invention utilizes the amplitude-modulated bias signal instead of the high frequency bias of the prior art system so that the magnetic recording with a better frequency characteristic without the attenuation of the high frequency component of the signal to be recorded becomes possible. In addition, the system of the present invention is simple in structure. The system of the present invention is therefore very effective and advantageous in the magnetic recording and reproducing system.

In the present embodiment, the magnetic recording head has been described as being the conventional magnetic head consisting of a magnet core carrying a coil so that the magnetic recording may be made upon the magnetic recording medium by the variation in flux leaked from the air gap. However, it is understood that the present invention is not limited to this type of the magnetic recording head and that other electro-magnetic transducers for converting the electrical signal into the magnetic signal such as the Hall effect element without the use of coils may be also employed in the system of the present invention.

In the present embodiment, the signals have been described as being the currents, but it is understood that the voltage signals may be also used.

What is claimed is:

1. A magnetic recording system for recording a signal upon a magnetic recording medium comprising means for providing an input signal to be recorded, a high-frequency signal source, a modulating signal source for providing a modulating signal having a substantially constant frequency which is lower than said high frequency signal but higher than the highest frequency of said input signal to be recorded, amplitude-modulating means coupled to said high frequency source and said modulating signal source for providing an amplitude-modulated high frequency bias signal by modulating said high frequency signal with said modulating signal, means for superposing upon said input signal to be recorded said amplitude-modulated high frequency bias signal, and means for applying said superposed signals to an electromagnetic transducer means in contact with a magnetic recording medium.

2. A magnetic recording system according to claim 1 wherein said high frequency signal source and said modulating signal source provide sinusoidal waves so that the amplitude-modulated high frequency bias signal is a sinusoidal high frequency signal whose envelope is symmetrically increased and decreased repetetively

3. A magnetic recording system according to claim 2 wherein said amplitude modulator means comprises means for providing a percentage modulation which is about 100%.

4. A magnetic recording device for recording a signal upon a magnetic recording medium characterized by a first oscillator for generating a high frequency signal having a frequency higher than that of an input signal to be recorded, a second oscillator for generating a modulating wave having a frequency lower than that of said high frequency signal and higher than the highest frequency of said input signal to be recorded, an amplitude modulator electrically coupled to said first and second oscillators for amplitude-modulating said high frequency signal generated by said first oscillator by said modulating wave to thereby produce an output bias signal, a circuit for applying said input signal to be recorded, a superposition circuit electrically coupled to said amplitude modulator and said signal applying circuit for superposing the output of said amplitude modulator upon the output of said signal applying circuit, and an electromagnetic transducer means in contact with a magnetic recording medium, the output of said superposition circuit being applied to said electromagnetic transducer means so that the electrical signal from said superposition circuit may be converted into the magnetic signal so as to be recorded upon said magnetic recording medium as the remanent magnetism.

5. A magnetic recording device according to claim 4 wherein said superposition circuit has a filter for isolating said input signal to be recorded, which is interposed between the output terminal of said signal applying circuit and said amplitude modulator, and a bias signal isolating filter, both of said filters being coupled to said transducer means.

6. A magnetic recording system according to claim 4 wherein said first and second oscillators produce~- sinusoidal waveform signals, and the output of said first oscillator is amplitude-modulated at a percentage modulation of about 100 percent by said amplitude modulator.

* * * * *